UNITED STATES PATENT OFFICE 2,376,112

AMINATION OF DIHYDRIC PHENOLS

Frederic R. Bean and Thomas S. Donovan, Rochester, N. Y., assignors to Eastman Kodak Company, Rochester, N. Y., a corporation of New Jersey No Drawing. Application April 21, 1942, Serial No. 439,910

10 Claims. (Cl. 260—574)

This invention relates to the amination of dihydric phenols.

It is known that resorcinol can be aminated with ammonia or alkyl amines to give m-aminophenol or N-alkyl-m-aminophenols. Such aminations are carried out in aqueous media, in the presence of the corresponding ammonium salt of an acid, such as hydrochloric acid. It is also known that phenols can be aminated with aryl primary amines, without the initial addition of water, in the presence of a strong acid such as hydrochloric acid, sulfuric acid or phenol-sulfuric acid. Hydroquinone has been aminated with aliphatic and aromatic amines, using a small amount of phosphoric acid as catalyst and removing the water as formed. If, however, dihydric phenols are condensed with ammonia or amines in aqueous media, using small amounts of phosphoric acid as a catalyst, the phosphorous compound has substantially no catalytic effect.

We have now found that dihydric phenols can be advantageously aminated with ammonia and amines, in aqueous media, employing as a promotor for the reaction an ammonium salt corresponding to the aminating agent, said salt being an arsenate or a phosphate, providing the ammonium salt contains at least one-half equivalent of aminating agent for each molecular proportion of free aminating agent employed.

It is, accordingly, an object of our invention to provide an improved process for aminating dihydric phenols. Further objects will become apparent hereinafter.

In accordance with our invention, we aminate dihydric phenols by condensing the phenols, in aqueous media (e. g. in the presence of at least one molecular proportion of water for each molecular proportion of dihydric phenol), with an aminating agent selected from the group consisting of ammonia, primary amines and secondary amines, in the presence of an ammonium salt corresponding to the aminating agent, said ammonium salt being selected from the group consisting of arsenates and phosphates and containing at least 0.5 equivalent of aminating agent for each molecular proportion of free aminating agent employed. Advantageously about 0.75 to about 1.25 equivalents of aminating agent per molecular proportion of free aminating agent are employed, about one equivalent being especially suitable.

The condensations are advantageously effected in an autoclave at from about 170° to about 220° C., although temperatures outside these advantageous limits can be used. 200° C. is an especially suitable temperature.

The amount of water employed at the beginning of the condensations is advantageously at least sufficient that a solution of all of the materials present at the end of the condensation exists, at a temperature of 20° C.

The following examples will serve to illustrate the manner of practicing our invention:

*Example 1.—m-Aminophenol, using ammonium phosphate*

A mixture of 220 g. (2 mol.) of resorcinol, 139 g. (1 mol.+5%) of diammonium phosphate, 130 g. (2 mol.+5%) of 28% aqueous ammonia and 250 g. of water were heated in an autoclave with agitation for twelve hours at 200° C. The resulting pale, yellow solution was char-filtered and the filtrate made neutral to Brilliant Yellow with hydrochloric acid. Upon cooling the hot, neutral, colorless solution, a copious precipitate of m-aminophenol crystals formed. These were filtered off, washed with cold water and dried at 50° to 60° C. The yield was 70% of theory.

A similar condensation employing ammonium chloride instead of diammonium phosphate gave a yield of but 50%.

*Example 2.—m-Aminophenol, using ammonium arsenate*

A mixture of 220 g. (2 mol.) of resorcinol, 115 g. (0.5 mol.) of arsenic pentoxide, 252 g. (4 mol.) of 28% aqueous ammonia and 200 g. of water were heated in an autoclave with agitation for twelve hours at 200° C. The resulting solution was char-filtered and treated with 36% hydrochloric acid until faintly alkaline to Brilliant Yellow. Upon cooling the hot, nearly neutral solution, a copious precipitate of m-aminophenol crystals formed. These were filtered off, washed with cold water and dried at 50° to 60° C. The yield was 55% of theory.

*Example 3.—p-Aminophenol, using ammonium phosphate*

A mixture of 220 g. (2 mol.) of hydroquinone, 145 g. (1 mol.+9½%) of diammonium phosphate, 130 g. (2 mol.+5%) of 28% aqueous ammonia and 260 g. of water were heated in an autoclave with agitation at 200° C. for twelve hours. The resulting solution was char-filtered and treated with concentrated hydrochloric acid until slightly alkaline to Brilliant Yellow. Upon cooling the hot solution, p-aminophenol crystallized out. It was filtered off, washed with cold water and dried at 50° to 60° C. The yield was 60% of theory. Recrystallization from water gave light tan plates which melted at 183° to 184° C.

*Example 4.—o-Aminophenol, using ammonium phosphate*

A mixture of 220 g. (2 mol.) of catechol, 139 g. (1 mol.+5%) of diammonium phosphate, 130 g. (2 mol.+5%) of 28% aqueous ammonia and 250 g. of water were heated in an autoclave with agitation for twelve hours at 200° C. The resulting solution was char-filtered and treated with concentrated hydrochloric acid until faintly alkaline to Brilliant Yellow. Upon cooling the hot solution, o-aminophenol crystallized out as brown crystals melting at 168° to 170° C. The yield was 22% of theory.

*Example 5.—N-methyl-m-aminophenol, using methyl ammonium phosphate*

A solution of methyl ammonium phosphate was prepared by adding, with cooling, 139 g. of 85% phosphoric acid to 262 g. of 25% aqueous methyl amine. The resulting solution was autoclaved with 220 g. of resorcinol and 262 g. of 25% aqueous methyl amine for twelve hours at 200° C. The reaction mixture was made strongly alkaline with sodium hydroxide and the excess methyl amine was distilled off in vacuo. The resulting mixture was neutralized with hydrochloric acid, causing the separation of an oil which was fractionally distilled in vacuo. The fraction boiling at 193° to 200° C. at 50 to 58 mm. of mercury was collected. This fraction formed an oxalate salt which melts with evolution of gas at 155° C. with prior shrinking at 152° C. The yield of N-methyl-m-aminophenol was 60% of theory.

*Example 6.—N,N-diethyl-m-aminophenol, using diethyl ammonium phosphate*

A solution containing about 1 mol. of diethyl ammonium phosphate was made up from 153 g. of diethyl amine, 250 g. of water and 120 g. of 85% phosphoric acid. The resulting solution was autoclaved at 200° C. for twelve hours with 220 g. of resorcinol and 153 g. of diethyl amine. The resulting reaction mixture was treated with 4 mol. of 40% aqueous sodium hydroxide and distilled in vacuo to remove excess diethyl amine. The resulting mixture was char-filtered and neutralized with concentrated hydrochloric acid, causing the separation of an oil which was removed and fractionally distilled in vacuo. The fraction, boiling at 148° to 152° C. at 7 to 9 mm. of mercury, was collected. The yield was 30% of theory.

*Example 7.—N-phenyl-m-aminophenol, using phenyl ammonium phosphate*

120 g. of 85% phosphoric acid were added to a mixture of 202 g. of aniline and 500 g. of water. The resulting thick, slurry contains about 1 mol. of phenyl ammonium phosphate. It was heated in an autoclave with 220 g. of resorcinol, 200 g. of water and 98 g. of aniline for twelve hours at 200° C. The resulting cooled reaction mixture was treated with 5 mol. of 40% aqueous sodium hydroxide and the excess aniline was removed by steam distillation. The resulting solution was char-filtered and neutralized with concentrated hydrochloric acid, causing a copious precipitate of an oil which crystallized on standing. The oil was removed and dissolved in a dilute sodium hydroxide solution and reprecipitated by addition of hydrochloric acid. The crystals which formed were filtered off, washed and dried. Upon recrystallization from water, the crystals melted at 80° to 82° C. The yield was 80% of theory.

*Example 8.—N-(n-primary butyl)-m-aminophenol, using butyl ammonium phosphate*

A solution of butyl ammonium phosphate was prepared by adding 60 g. of 85% phosphoric acid to 73 g. of n-primary butyl amine in 200 cc. of water. The resulting solution was autoclaved with agitation for twelve hours at 200° C. with 110 g. of resorcinol and 73 g. of m-primary butyl amine. The resulting cooled reaction mixture was acidified with hydrochloric acid and extracted with diethyl ether to remove unreacted resorcinol. On neutralization of the residual aqueous liquor, a yellowish oil separated. The oil was removed and distilled in vacuo. The main portion boiled at 164° to 168° at 10 mm. The colorless distillate solidified on cooling, giving white needles which melted at 53° to 56° C.

*Example 9.—N-methyl-p-aminophenol, using methyl ammonium phosphate*

A solution containing 84 g. of methyl ammonium phosphate was prepared by adding, with cooling, 60 g. of 85% phosphoric acid to 130 g. of 25% aqueous methyl amine and 100 g. of water. To this solution were added 110 g. of hydroquinone and 131 g. of 25% aqueous methyl amine. The mixture was heated in an autoclave with agitation at 180° C. for five hours. The reaction mixture was cooled, removed from the autoclave and treated with 250 cc. of 40% aqueous sodium hydroxide. The resulting mixture was distilled to remove excess methyl amine. The residue was cooled and extracted with diethyl ether to remove N,N'-dimethyl-p-phenylene diamine which was isolated as the di-oxalate by evaporating off the ether, taking up the oily residue in a hot aqueous oxalic acid solution, concentrating and cooling. The dioxalate crystallized out as tan-colored needles, melting at 194° to 196° C. with decomposition. The alkaline aqueous layer remaining after the aforesaid ether extraction was decolorized with char and then made acid to Congo red with sulfuric acid. The acid solution was again extracted with diethyl ether to remove unreacted hydroquinone, (in this case, 13 g.). The N-methyl-p-aminophenol can be isolated from the remaining aqueous solution as the sulfate by concentrating and cooling the solution, or as the N-nitroso derivative by adding to the cold solution an excess aqueous sodium nitrite. In the latter case, fine yellow needles, melting at 135° C., are obtained. The yield of N-methyl-p-aminophenol sulfate was 90 g., 52% of theory. The N,N'-dimethyl-p-phenylene diamine which was isolated as the oxalate accounted for 25% of the hydroquinone, while 12% of the hydroquinone was recovered unchanged.

In our process condensation of about one molecular proportion of dihydric phenol with about one molecular proportion of aminating agent usually results in but one of the phenolic hydroxyl groups undergoing amination. The most notable exception is the condensation of hydroquinone with methyl amine where a considerable amount of the phenylene diamine derivative is formed. Using larger amounts of aminating agent, it is possible to aminate both phenolic hydroxyl groups of most dihydric phenols in accordance with our process.

The ammonium arsenates or phosphates which we employ in practicing our invention can be the mono-, di- or tri-ammonium arsenates or phosphates, but in any case the ammonium salt must contain at least 0.5 equivalents of aminating agent for each molecular proportion of free aminating agent employed. Mixtures of ammonium arsenates and ammonium phosphates can be employed.

What we claim as our invention and desire to be secured by Letters Patent of the United States is:

1. A process for aminating a dihydric phenol comprising condensing, in aqueous media, a dihydric phenol with an aminating agent selected from the group consisting of ammonia, primary amines and secondary amines, in the presence of an ammonium salt corresponding to the aminating agent, said ammonium salt being selected from the group consisting of arsenates and phosphates and containing at least 0.5 equivalent of aminating agent for each molecular proportion of free aminating agent employed.

2. A process for aminating a dihydric phenol comprising condensing, in aqueous media, a dihydric phenol with an aminating agent selected from the group consisting of ammonia, primary amines and secondary amines, in the presence of an ammonium salt corresponding to the aminating agent, said ammonium salt being selected from the group consisting of arsenates and phosphates and containing from about 0.75 to about 1.25 equivalents of aminating agent for each molecular proportion of free aminating agent employed.

3. A process for aminating a dihydric phenol comprising condensing, in aqueous media, a dihydric phenol with an aminating agent selected from the group consisting of ammonia, primary amines and secondary amines, in the presence of an ammonium salt corresponding to the aminating agent, said ammonium salt being selected from the group consisting of arsenates and phosphates and containing about 1 equivalent of aminating agent for each molecular proportion of free aminating agent employed.

4. A process for aminating a dihydric phenol comprising condensing a dihydric phenol with an aminating agent selected from the group consisting of ammonia, primary amines and secondary amines, in the presence of an ammonium salt corresponding to the aminating agent, said ammonium salt being selected from the group consisting of arsenates and phosphates and containing at least 0.5 equivalents of aminating agent for each molecular proportion of free aminating agent employed, the condensation being effected in the presence of sufficient water to give a solution of all the materials present at the end of the condensation at 20° C.

5. A process for aminating a dihydric phenol comprising condensing a dihydric phenol with an aminating agent selected from the group consisting of ammonia, primary amines and secondary amines, in the presence of an ammonium salt corresponding to the aminating agent, said ammonium salt being selected from the group consisting of arsenates and phosphates and containing from about 0.75 to about 1.25 equivalents of aminating agent for each molecular proportion of free aminating agent employed, the condensation being effected in the presence of sufficient water to give a solution of all the materials present at the end of the condensation at 20° C.

6. A process for aminating a dihydric phenol comprising condensing a dihydric phenol with an aminating agent selected from the group consisting of ammonia, primary amines and secondary amines, in the presence of an ammonium salt corresponding to the aminating agent, said ammonium salt being selected from the group consisting of arsenates and phosphates and containing about one equivalent of aminating agent for each molecular proportion of free aminating agent employed, the condensation being effected in the presence of sufficient water to give a solution of all the materials present at the end of the condensation at 20° C.

7. A process for aminating a dihydric phenol comprising condensing a dihydric phenol with ammonia, in the presence of an ammonium phosphate containing from about 0.75 to about 1.25 equivalents of ammonia for each molecular proportion of free ammonia employed as aminating agent, the condensation being effected in the presence of sufficient water to give a solution of all the materials present at the end of the condensation at 20° C.

8. A process for aminating resorcinol comprising condensing resorcinol with ammonia, in the presence of an ammonium phosphate containing from about 0.75 to about 1.25 equivalents of ammonia for each molecular proportion of free ammonia employed as aminating agent, the condensation being effected in the presence of sufficient water to give a solution of all the materials present at the end of the condensation at 20° C.

9. A process for aminating hydroquinone comprising condensing hydroquinone with ammonia, in the presence of an ammonium phosphate containing from about 0.75 to about 1.25 equivalents of ammonia for each molecular proportion of free ammonia employed as aminating agent, the condensation being effected in the presence of sufficient water to give a solution of all the materials present at the end of the condensation at 20° C.

10. A process for aminating a dihydric phenol comprising condensing a dihydric phenol with an alkyl primary amine in which the alkyl group contains from 1 to 5 carbon atoms, in the presence of an ammonium phosphate containing from about 0.75 to about 1.25 equivalents of alkyl primary amine for each molecular proportion of free alkyl primary amine employed as aminating agent, the condensation being effected in the presence of sufficient water to give a solution of all the materials present at the end of the condensation at 20° C.

FREDERIC R. BEAN.
THOMAS S. DONOVAN.